3,803,209
PROCESS FOR THE PRODUCTION OF SUCCINYLOSUCCINIC DIESTERS

Erich Greth, Visp, Switzerland, assignor to Lonza Ltd., Basel, Switzerland
No Drawing. Filed July 13, 1972, Ser. No. 271,359
Claims priority, application Switzerland, Mar. 22, 1972, 4,237/72
Int. Cl. C07c 69/74
U.S. Cl. 260—468 K          16 Claims

ABSTRACT OF THE DISCLOSURE

A novel process for the production of succinylosuccinic acid diester is disclosed. The process includes reacting a γ-haloacetoacetic ester with a strong base. The reaction is conducted in the presence of an aqueous buffer solution of at least one inorganic salt at a pH of 8 to 10. The reaction is conducted at a temperature between —10° and 10° C., preferably between —2° and 0° C. The succinylosuccinic acid diester can be isolated by any convenient method such as filtering or centrifuging it from the reaction solution.

BACKGROUND OF THIS INVENTION

(1) Field of this invention

This invention relates to a process for the production of succinylosuccinic acid diester from γ-haloacetoacetic ester and a strong base in a water medium.

(2) Prior art

Succinylosuccinic acid diester has been produced by reaction from γ-chloroacetoacetic ester in water by reaction with sodium phenolate; in that case, a yield of only 58 percent was obtained (Bull. Soc. Chim. France 29, 192, pp. 402–6).

Succinylosuccinic acid diester has been produced from succinic acid diethyl ester (as a starting material). In that case the succinic acid diethyl ester was reacted with sodium ethylate. The highest yield that was achieved by that process was around 80 percent (U.S. Pat. No. 3,024,268). The main disadvantage of that process, however, is that the isolation of the resultant succinylosuccinic acid diester is exceedingly cumbersome, difficult and time consuming. Furthermore, large quantities of solvent are needed in that process.

Succinylosuccinic esters have been prepared from ethyl succinate and Na using a double Claisen reaction. Whitmore, F. C., "Organic Chemistry," 2nd ed. (1951), p. 381. Succinylosuccinic esters have been produced by reacting $NaOC_2H_5$ and ethyl succinate. Whitmore, ibid, p. 708.

BROAD DESCRIPTION OF THIS INVENTION

An object of the invention is to produce succinylosuccinic acid diester from γ-haloacetoacetic ester in high yields using a simple process.

The process of this invention involves the production of succinylosuccinic acid diester. The process includes reacting a 4-halo-acetoacetic acid esters having the formula:

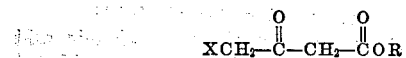

wherein X is a halogen atom and R is a lower alkyl group containing one to 10 carbon atoms, with a strong base. The reaction is conducted in the presence of an aqueous buffer solution of at least one inorganic salt at a pH of 8 to 10. The reaction is conducted at a temperature between —10° and 10° C., preferably between —2° and 0° C. The succinylosuccinic acid diester can be isolated by any convenient method such as filtering or centrifuging it from the reaction solution. The product has a white to slightly yellowish color and has a purity of greater than 99 percent.

The succiniylosuccinic acid diesters are used for the production of quinoacridone dyes and in the production of polymers.

DETAILED DESCRIPTION OF THIS INVENTION

The pH of the reaction solution must be retained between 8 and 10, preferably between 9 and 10, and most preferably at 9.5.

The required pH range during the reaction or conversion is maintained by the use of an aqueous buffer solution, the buffer being comprised of at least one inorganic salt. Preferably the buffer is comprised of two inorganic salts or an inorganic salt and a strong inorganic base (e.g., NaOH). The preferred buffer is a mixture of $Na_2CO_3$ and $NaHCO_3$, being preferably used at a ratio of 0.5 to 1.5 moles of $Na_2CO_3$. When the buffer is a mixture of $NaHCO_3$ and NaOH their ratio is preferably 1 mole of $NaHCO_3$ to 0.2 to 0.8 mole NaOH. An example of another useful buffer is a mixture of $Na_2B_4O_7$ and sodium hydroxide.

The reaction is conducted at a temperature between —10° and 10° C., preferably between —2° and 0° C.

The strong base should be a strong inorganic base. The strong base should have a dissociation constant ($k$), in aqueous solutions, of at least $1 \times 10^{-3}$ and preferably of at least $1 \times 10^{-2}$. Examples of useful strong inorganic bases are: sodium hydroxide (most preferred); potassium hydroxide; barium hydroxide; and calcium hydroxide. Mixtures of strong bases can be used.

The γ-haloacetoacetic acid esters are usually prepared from an alcohol and γ-haloacetoacetic acid chloride. R in the ester formula can be any alkyl group containing one to ten carbon atoms and can be a straight chain or branch chain alkyl group. Examples of useful alkyl groups which R can be are: methyl, ethyl (preferred) n-propyl, isopropyl, n-butyl, isobutyl, n-pentyl, isopentyl, n-hexyl, n-heptyl, n-octyl, n-nonyl, n-decyl, neo-pentyl, 2,4-dimethyl-3-pentyl, 2-heptyl, 3-heptyl, 2-methyl-2-heptyl, 3-methyl-2-heptyl, 4-heptyl, 2,6-dimethyl, 4-heptyl, 4-ethyl-4-heptyl, 2-methyl-1-heptyl, 4-methyl-4-heptyl, 3-methyl-1-heptyl, 4-propyl-4-heptyl, 4-methyl-1-heptyl, 2,2,3,3-tetramethyl butyl, 2,3-dimethyl pentyl, 2, 2,4-trimethyl pentyl, 2,4-dimethyl-3-ethyl-3-hexyl, 2-ethyl-hexyl, 2-butyl, t.-butyl, 2-methyl-1-butyl, 2-pentyl, 3-pentyl, 3-methyl-2-butyl, 2-methyl-2-butyl, 2-methyl-1-pentyl, 3-methyl-1-pentyl, 4-methyl-1-pentyl, 2-ethyl-1-butyl, t.-amyl, 2,3-dimethyl-1-butyl, 2-hexyl, 3-hexyl, 3-methyl-2-pentyl, 2,2-dimethyl-3-butyl, 4-methyl-2-pentyl, 2,3-dimethyl-2-butyl, 2-methyl-3-pentyl, and 3-methyl-3-pentyl, and 2-methyl-2-pentyl. Preferably R is an alkyl group having one to four carbon atoms.

As used herein X can be chlorine, bromine, iodine or fluorine, but chlorine is preferred.

Examples of useful γ-haloacetoacetic acid esters are:

γ-chloroacetoacetic acid ethyl ester (preferred),
γ-chloroacetoacetic acid methyl ester,
γ-chloroacetoacetic acid n-propyl ester
γ-chloroacetoacetic acid isopropyl ester,
γ-chloroacetoacetic acid n-butyl ester,
γ-chloroacetoacetic acid isopentyl ester,
γ-chloroacetoacetic acid n-hexyl ester,
γ-chloroacetoacetic acid n-decyl ester,
γ-chloroacetoacetic acid 4-methyl-1-heptylester
γ-bromoacetoacetic acid methyl ester
γ-bromoacetoacetic acid ethyl ester
γ-bromoacetoacetic acid n-propyl ester,
γ-bromoacetoacetic acid n-hexyl ester,
γ-fluoroacetoacetic acid ethyl ester, and
γ-iodoacetoacetic acid ethyl ester.

Succinylosuccinic acid diester is also termed succinosuccinic ester or 1,4-dicarbethoxy-2,5-diketocyclohexane or succinylosuccinic ester and has the following general formula:

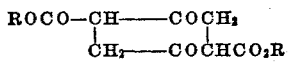

R is defined above and can be different lower alkyl groups.

The succinylosuccinic acid diester can be isolated from the reaction solution by any conventional or convenient means such as filtering or centrifuging the reaction solution. The product is white to slightly yellowish in color and has a purity above 99 percent.

The succinylosuccinic acid diester are used for the production of quinoacridone dyes and in the production of polymers.

In the following examples and throughout the rest of the application, all parts, ratios, and percentages are on a weight basis unless otherwise stated or obviously so to one ordinarily skilled in the art.

EXAMPLE 1

11.50 gm. of anhydrous sodium carbonate (0.108 mole) and 3.10 gm. of sodium bicarbonate (0.036 mole) were dissolved in water, the admixture's temperature was lowered to $-1.5°$ C., and 11.88 gm. of $\gamma$-chloroacetoacetic ethyl ester (0.072 mole) were added to the admixture at $-1.5°$ C. while stirring. After 24 hours, the resultant precipitate was separated, by means of suction, at $-1.5°$ C. The removed precipitate was suspended in 150 ml. of water, was separated by means of suction, and was then dried. 6.951 gm. of succinylosuccinic acid diethyl ester were obtained, which corresponds to a yield of 75.1 percent. The resultant ester had a purity of 99.8 percent and a melting point of 126.3° to 126.4° C.

EXAMPLE 2

Example 1 was repeated except that 11.738 gm. of $\gamma$-chloroacetoacetic acid methyl ester was used in place of the $\gamma$-chloroacetoacetic acid ethyl ester. 6.233 gm. of succinylosuccinic acid dimethyl ester were obtained. The yield was 70.1 percent and the product had a melting point of 153.4° C.

EXAMPLE 3

Example 1 was repeated except that 12.395 gm. of $\gamma$-chloroacetoacetic acid isopropyl ester was used in place of the $\gamma$-chloroacetoacetic acid ethyl ester. 6.304 gm. of succinylosuccinic acid diisopropyl ester ($C_{14}H_{20}O_6$) were obtained. The yield was 63.9 percent and the product had a melting point of 102.8° C.

An elementary analysis of the product was: Found: C, 59.3%; H, 7.1%; O, 33.6% (by difference). Calculated: C, 59.14%; H, 7.05%; O, 33.76%.

EXAMPLE 4

15.20 gm. of sodium bicarbonate (0.18 mole) and 4.30 gm. of caustic soda solution (0.108 mole) were dissolved in 200 ml. of water. The solution temperature was reduced to $-1.5°$ C. The reaction was conducted at $-1.5°$ C. while stirring after 11.712 gm. of $\gamma$-chloroacetoacetic acid ethyl ester were added. After 24 hours, the precipitate was isolated by means of suction at $-1.5°$ C. The product was suspended in 150 ml. of water, water isolated by means of suction and then dried. 6,746 gm. of succinylosuccinic acid diethyl ester were obtained in a yield of 74.0 percent.

EXAMPLE 5

Example 1 was repeated except that the reaction was conducted at $-10°$ C. after the addition of 30 g. of ethylene glycol.

EXAMPLE 6

Example 1 was repeated except that the reaction was conducted at 10° C.

EXAMPLE 7

Example 1 was repeated except that an equal molar mixture of $\gamma$-chloroacetoacetic acid ethyl esters and $\gamma$-chloroacetoacetic acid methyl ester was used in place of the $\gamma$-chloroacetoacetic acid ethyl ester.

EXAMPLE 8

Example 1 was repeated except that potassium hydroxide was used in place of the sodium hydroxide.

EXAMPLE 9

Example 1 was repeated except that barium hydroxide was used in place of the sodium hydroxide.

EXAMPLE 10

Example 1 was repeated except that $\gamma$-chloroacetoacetic acid n-butyl ester was used in place of the $\gamma$-chloroacetoacetic acid ethyl ester.

EXAMPLE 11

Example 1 was repeated except that $\gamma$-bromoacetoacetim acid ethyl ester was used in place of the $\gamma$-chloroacetoacetic acid ethyl ester.

What is claimed is:

1. A process for the production of succinylosuccinic acid diester which comprises reacting a $\gamma$-haloacetoacetic acid alkyl ester with a strong base, said reaction being conducted in an aqueous buffer solution of at least one inorganic salt at a pH of 8 to 10.

2. A process as described in claim 1 wherein said succinylosuccinic acid diester is recovered from said solution.

3. A process as described in claim 1 wherein said reaction was conducted at a pH of 9 to 10.

4. A process as described in claim 1 wherein said strong base is sodium hydroxide.

5. A process as described in claim 1 wherein said $\gamma$-haloacetoacetic acid ester is $\gamma$-chloroacetoacetic acid ethyl ester.

6. A process as described in claim 1 wherein said $\gamma$-haloacetoacetic acid ester is $\gamma$-chloroacetoacetic acid methyl ester.

7. A process as described in claim 1 wherein said $\gamma$-haloacetoacetic acid ester is $\gamma$-chloroacetoacetic acid isopropyl ester.

8. A process as described in claim 1 wherein the alkyl group in said $\gamma$-haloacetoacetic acid ester has from one to four carbon atoms.

9. A process as described in claim 1 wherein said aqueous buffer solution contains $Na_2CO_3$ and $NaHCO_3$ as the buffering components, said $Na_2CO_3$ and $NaHCO_3$ as the buffering components, said $Na_2CO_3$ and $NaHCO_3$ being present in a ratio of 0.5 to 1.5 moles of $Na_2CO_3$ to 1.5 to 0.5 moles of $NaHCO_3$.

10. A process as described in claim 9 wherein said reaction is conducted at a temperature between $-10°$ and $10°$ C.

11. A process as described in claim 1 wherein said aqueous buffer solution contains $NaHCO_3$ and $NaOH$, said $NaHCO_3$ and $NaOH$ being present in a ratio of 1 mole of $NaHCO_3$ to 0.2 to 0.8 moles of $NaOH$.

12. A process as described in claim 11 wherein said reaction is conducted at a temperature between $-10°$ and $10°$ C.

13. A process as described in claim 1 wherein said aqueous buffer solution contains borax and $NaOH$, said borax and $NaOH$ being present in a ratio of 1 mole of borax to 0.08 to 1.5 moles of $NaOH$.

14. A process as described in claim 13 wherein reaction is conducted at a temperature between $-10°$ and $10°$ C.

15. A process as described in claim 1 wherein said γ-haloacetoacetic acid ester has the formula:

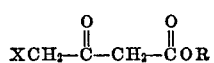

wherein X is a halogen atom and R is an alkyl group containing one to ten carbon atoms.

16. A process as described in claim 15 wherein said reaction is conducted at a temperature between −10° and 10° C.

References Cited

Hedelius, A. H. J., Z. Physik. Chem. 96, 343–66 (1920).

House, H. D. Modern Synthetic Reactions (1965) 163–167.

LORRAINE A. WEINBERGER, Primary Examiner

P. L. KILLOS, Assistant Examiner